US 7,954,116 B2

(12) United States Patent
Ng et al.

(10) Patent No.: US 7,954,116 B2
(45) Date of Patent: May 31, 2011

(54) COMBINATION COMPACT DISK PLAYER AND JEWELRY BOX

(75) Inventors: Po Yi Ng, Sunnyvale, CA (US); Chris Heatherly, Pasadena, CA (US); Mikal Barry Greaves, Mountain View, CA (US); Jonathan Guerra, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1119 days.

(21) Appl. No.: 11/109,219

(22) Filed: Apr. 18, 2005

(65) Prior Publication Data

US 2005/0236285 A1 Oct. 27, 2005

Related U.S. Application Data

(60) Provisional application No. 60/565,912, filed on Apr. 27, 2004.

(51) Int. Cl.
*G11B 17/03* (2006.01)
*A45C 11/04* (2006.01)
*B65D 85/575* (2006.01)
*B65D 85/30* (2006.01)

(52) U.S. Cl. .... 720/600; 206/6.1; 206/307.1; 206/308.1

(58) Field of Classification Search ............ 206/6.1, 206/566, 216, 314, 301, 18, 308.1, 232, 307, 206/307.1; 720/600; 369/75.11; 312/9.64, 312/8.11
See application file for complete search history.

(56) References Cited

U.S. PATENT DOCUMENTS

| 1,410,897 | A | * | 3/1922 | Di Giacomo et al. | 369/75.11 |
| 2,353,320 | A | * | 7/1944 | Sinclaire | 369/20 |
| 4,371,077 | A | * | 2/1983 | Solitt et al. | 206/759 |
| 4,478,330 | A | * | 10/1984 | Lin | 206/38 |
| D333,821 | S | * | 3/1993 | Takimoto | D14/501 |
| D350,753 | S | * | 9/1994 | Oka | D14/168 |
| 5,358,100 | A | * | 10/1994 | Wolff | 206/749 |
| D366,658 | S | * | 1/1996 | Fukutome | D14/168 |
| 5,696,333 | A | * | 12/1997 | Shih | 84/95.2 |
| 5,810,168 | A | * | 9/1998 | Eggering | 206/372 |
| 5,979,175 | A | * | 11/1999 | Ellison | 62/457.7 |
| D459,881 | S | * | 7/2002 | Kim | D3/273 |
| D485,682 | S | * | 1/2004 | Wolf | D3/295 |
| 6,688,710 | B2 | * | 2/2004 | Tagawa | 312/223.2 |
| 6,926,136 | B1 | * | 8/2005 | Lynch-Bass | 206/6.1 |
| 6,948,177 | B2 | * | 9/2005 | Rafferty | 720/600 |
| D514,892 | S | * | 2/2006 | Lee | D7/605 |
| 7,188,491 | B2 | * | 3/2007 | Donald et al. | 62/457.7 |
| 2002/0100777 | A1 | * | 8/2002 | Zheng | 224/153 |
| 2002/0105886 | A1 | * | 8/2002 | Ramonowski | 369/75.1 |
| 2003/0139169 | A1 | * | 7/2003 | Arreazola, Jr. | 455/344 |
| 2004/0013070 | A1 | * | 1/2004 | Rafferty | 369/75.1 |
| 2004/0187143 | A1 | * | 9/2004 | Tolkachev et al. | 720/655 |
| 2006/0070892 | A1 | * | 4/2006 | Benson | 206/6.1 |

* cited by examiner

*Primary Examiner* — Mickey Yu
*Assistant Examiner* — Melissa L Lalli
(74) *Attorney, Agent, or Firm* — Ference & Associates LLC

(57) ABSTRACT

A combination compact disk player and jewelry box is disclosed having a housing, a compact disk (CD) player internally mounted in the housing with built-in compact disk storage. Mechanism for playing the CDs is provided and at least one slide out drawer is provided for holding jewelry and other trinkets therein.

9 Claims, 6 Drawing Sheets

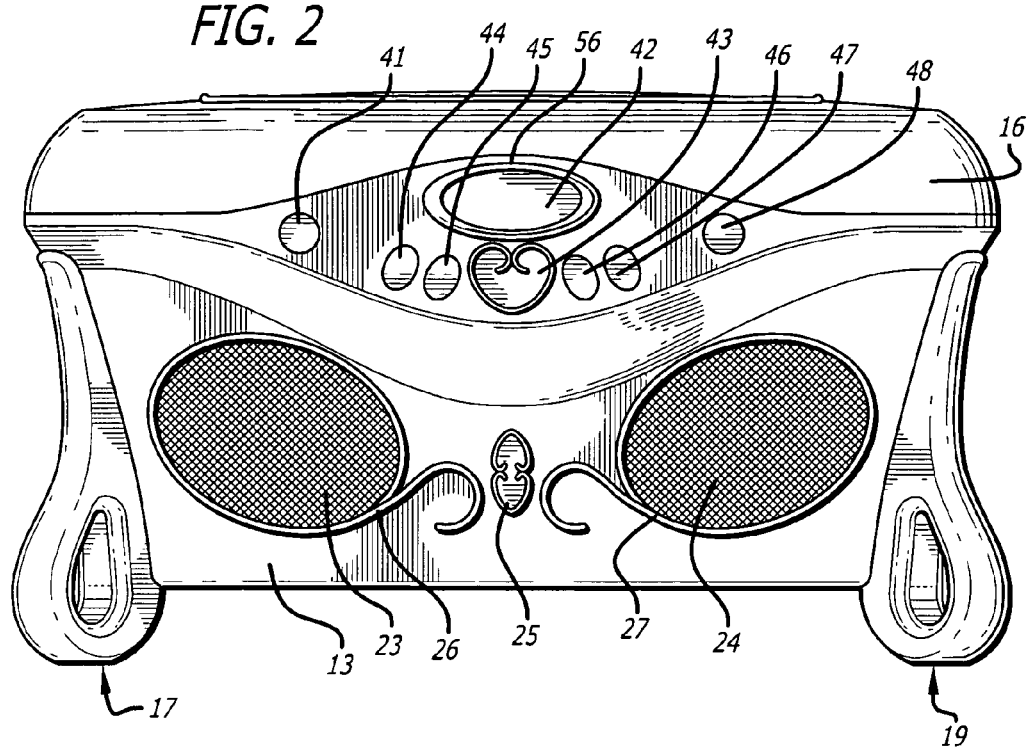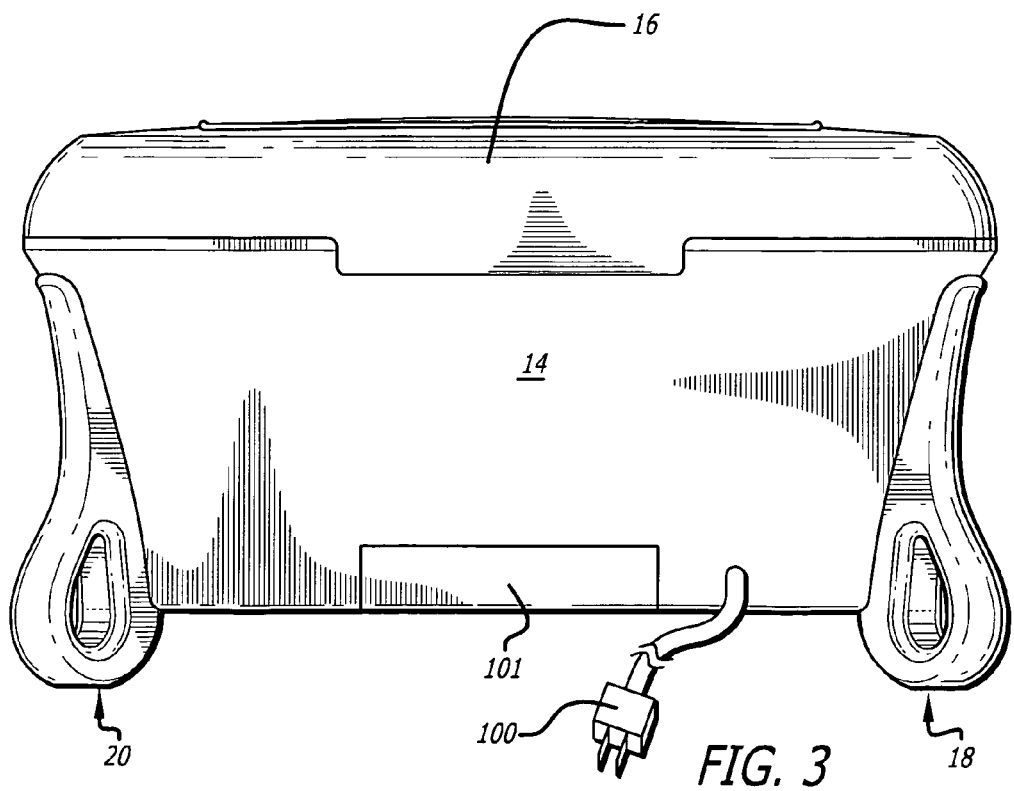

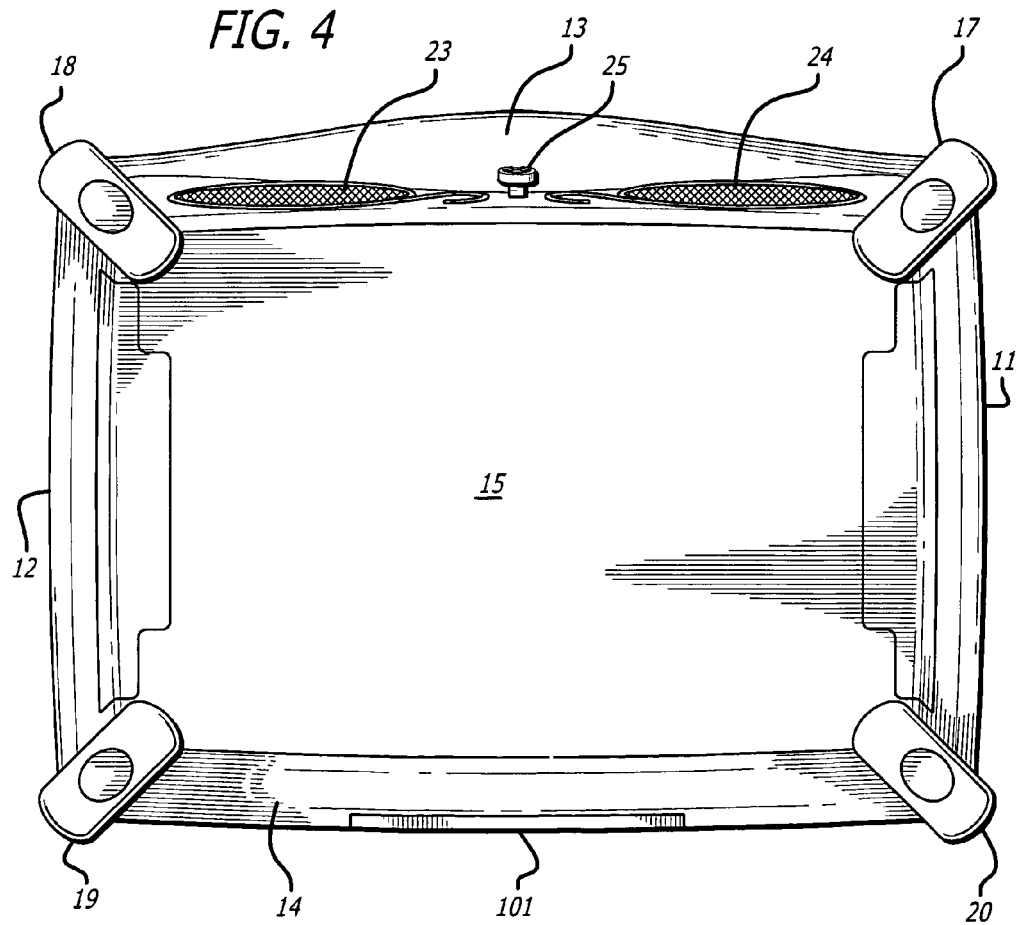

COMBINATION COMPACT DISK PLAYER AND JEWELRY BOX

CROSS-REFERENCE To RELATED APPLICATION

This application claims the benefit of provisional application Ser. No. 60/565,912, filed Apr. 27, 2004, the contents of which are incorporated by reference herein in their entirety.

BACKGROUND

1. Field

The present disclosure relates to compact disk players; and, more particularly, to a compact disk player combined with a jewelry box.

2. Related Art

Compact disk players are well known in the art and quite popular among adults and children. Jewelry boxes are also well known and quite popular with young children, particularly girls. Jewelry boxes with a theme, such as an association with a popular attraction at a venue, or a movie or television character, are quite desirable.

There is a need for a combination jewelry box and compact disk player that is attractive to a child or the like.

SUMMARY

It is an object of the present disclosure to provide a combined compact disk player and jewelry box. Such a device should be pleasing and attractive and may carry a theme associated with an attraction in a venue, such as a theme park, or associated with a movie or television program. Also, such a device should have a storage area for storing a plurality of compact disks so that one can take the device from one location to another without a need to carry the disks separately.

BRIEF DESCRIPTION OF THE DRAWINGS

The above-mentioned features and objects of the present disclosure will become more apparent with reference to the following description taken in conjunction with the accompanying drawings wherein like reference numerals denote like elements and in which:

FIG. 2 is a front view of the box of FIG. 1;

FIG. 3 is a rear view of the box of FIG. 1;

FIG. 4 is a bottom plan view of the box of FIG. 1;

DETAILED DESCRIPTION OF THE PREFERRED EMBODIMENT

Figure 1:
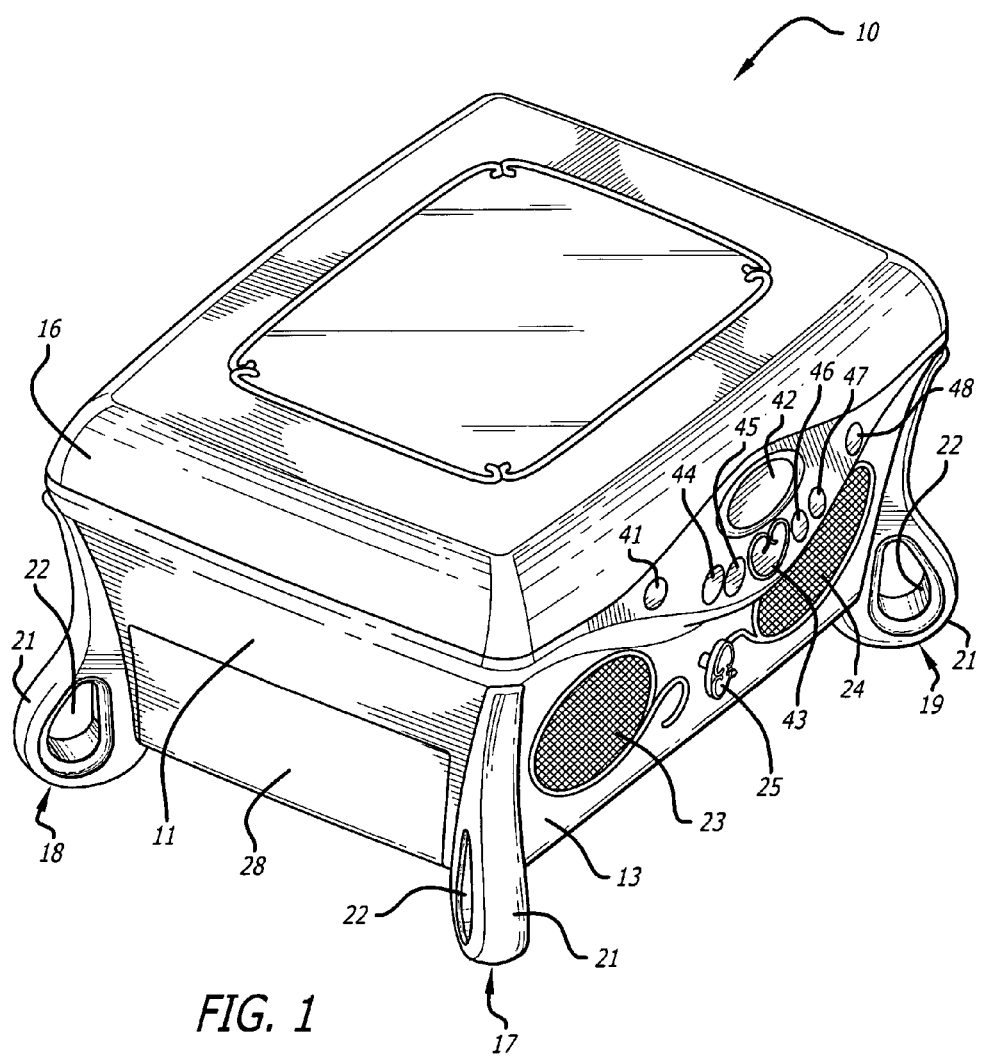
FIG. 1 is a perspective view of the combination compact disk player and jewelry box of the disclosure.

Referring now to FIG. 1 of the drawing, a combination compact disk player and jewelry box device 10 is shown.

Device 10 thus is generally rectangular in configuration having four interconnected sides, such as short side walls 11, 12 (see also FIG. 4) and longer front and rear side walls 13, 14, respectively (see FIGS. 1 and 4). Device 10 further includes a bottom wall 15, FIG. 4, interconnecting sides 11 to 14, and a top lid 16 (FIG. 1) closing off the open interior of device 10, Spaced legs 17 through 20 (see also FIG. 4) are provided at each corner of the bottom of device 10.

Any suitable configuration may be provided for device 10, such as oval, circular, etc. and, in the embodiment herein, any suitable number of spaced support legs may be provided. Legs 17 to 20 may be curved on the outer lower surface, as at curved portions 21, FIG. 1, which curvature extends about the bottom supporting surface of the legs and surrounds a tear drop shaped opening 22 to provide an aesthetically pleasing look.

A pair of spaced speaker grills 23, 24 are provided in front wall 13. An actuating button 25 as which will be described further herein below, is disposed between grills 23, 24. Decorative trim 26, 27 (see also FIG. 2) may be provided surrounding each grille 23, 24.

Figure 7:
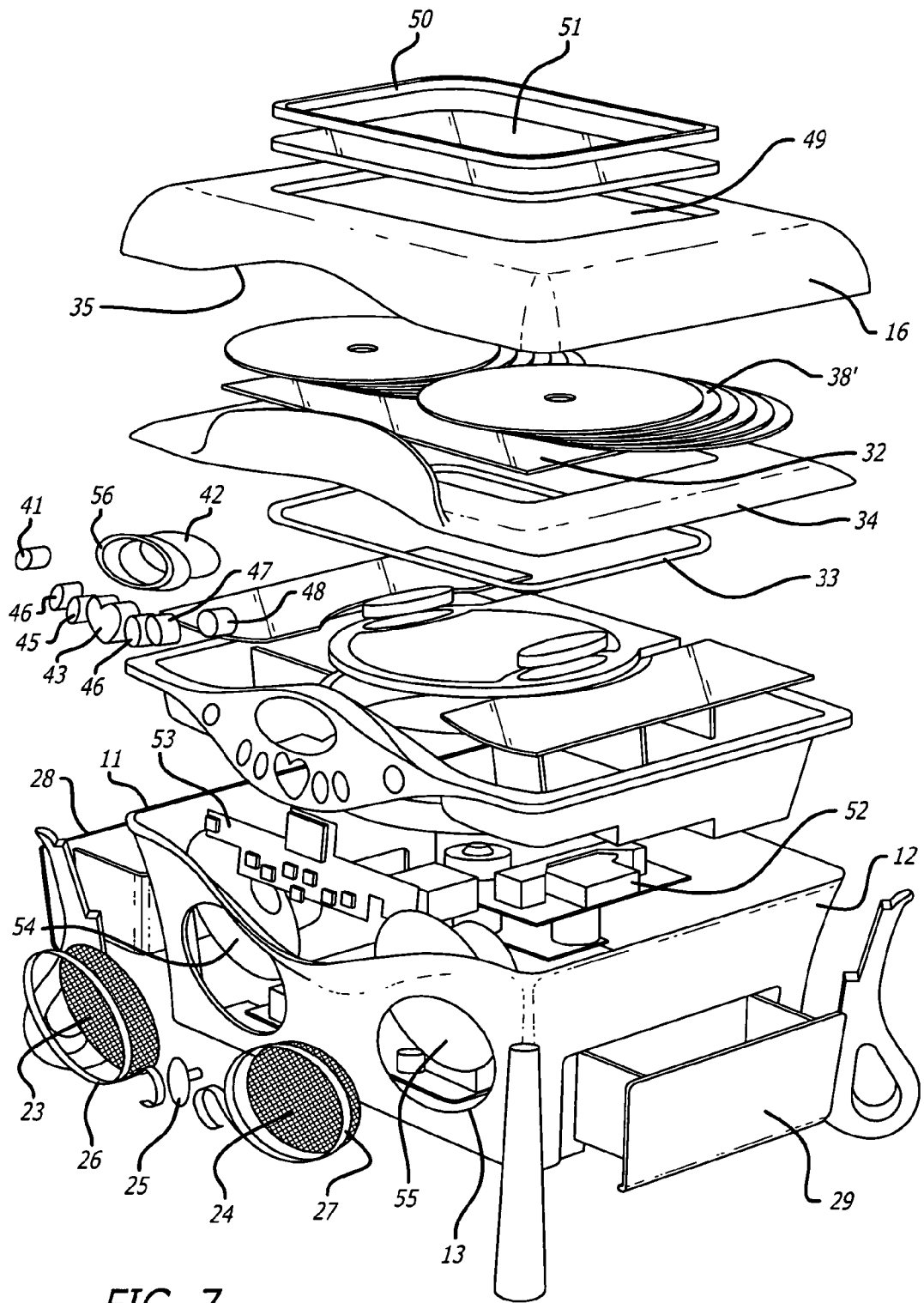
FIG. 7 is an exploded view of the box of FIGS. 1 to 6.

A pair of pull-out drawers 28, 29 are provided on each side of device 10 as seen in FIG. 1 and more particularly in the exploded view in FIG. 7.

Figure 5:
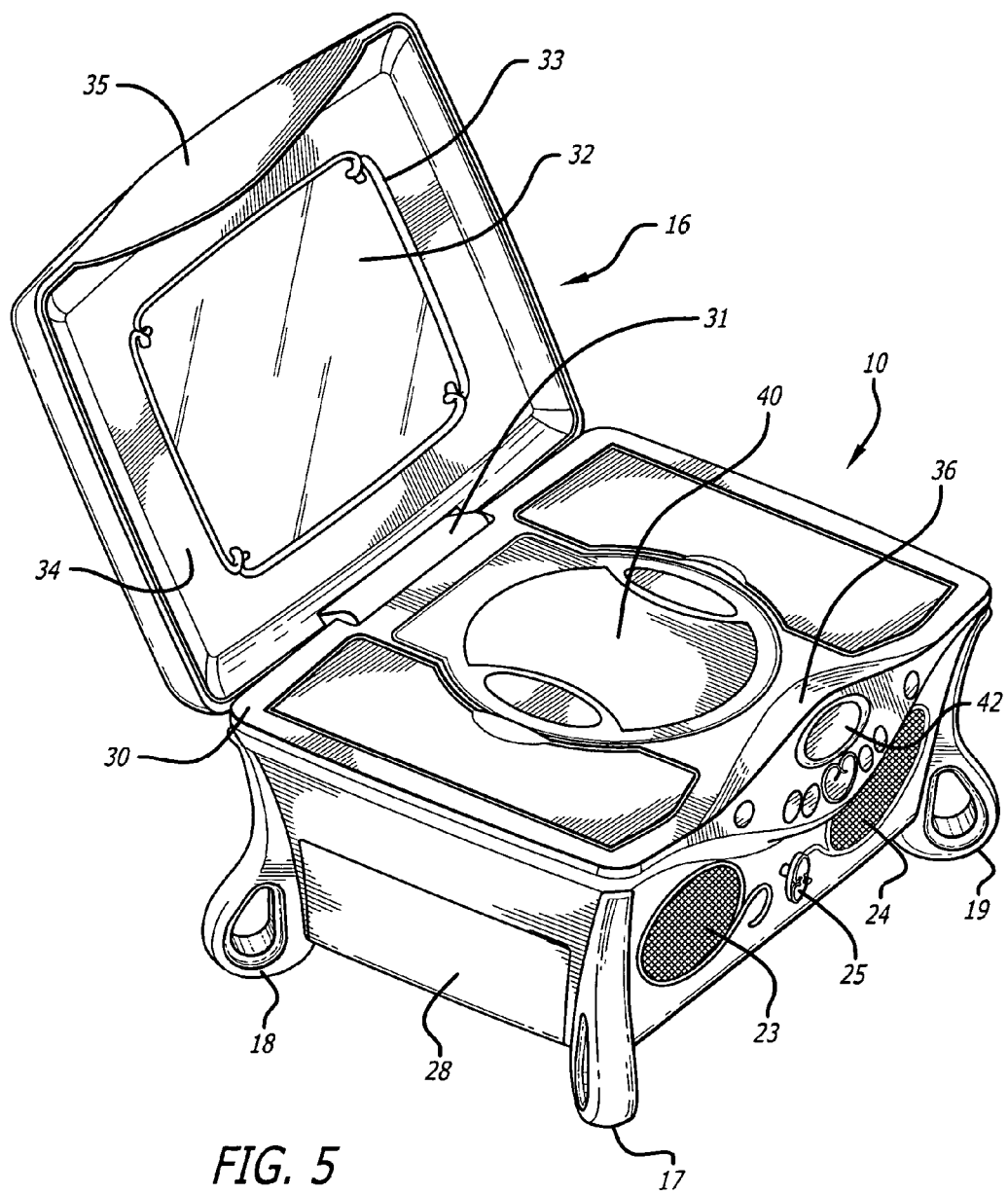
FIG. 5 is a perspective view of the box of FIG. 2, the lid thereof being shown in open position.

Device 10 is shown in FIG. 5 with the lid 16 in open position. The interior of device 10 is closed off by a top cover 30, lid 16 being hinged to top cover 30 by a hinge 31. The underside bezel wall 34 of lid 16 may include a mirror 32 held in place by a frame 33. Lid 16 (FIG. 7) may have an undercut portion 35 for assisting in lifting the same which mates with a like configured raised portion 36 (FIG. 5) when in the FIG. 1 closed position.

Figure 6:
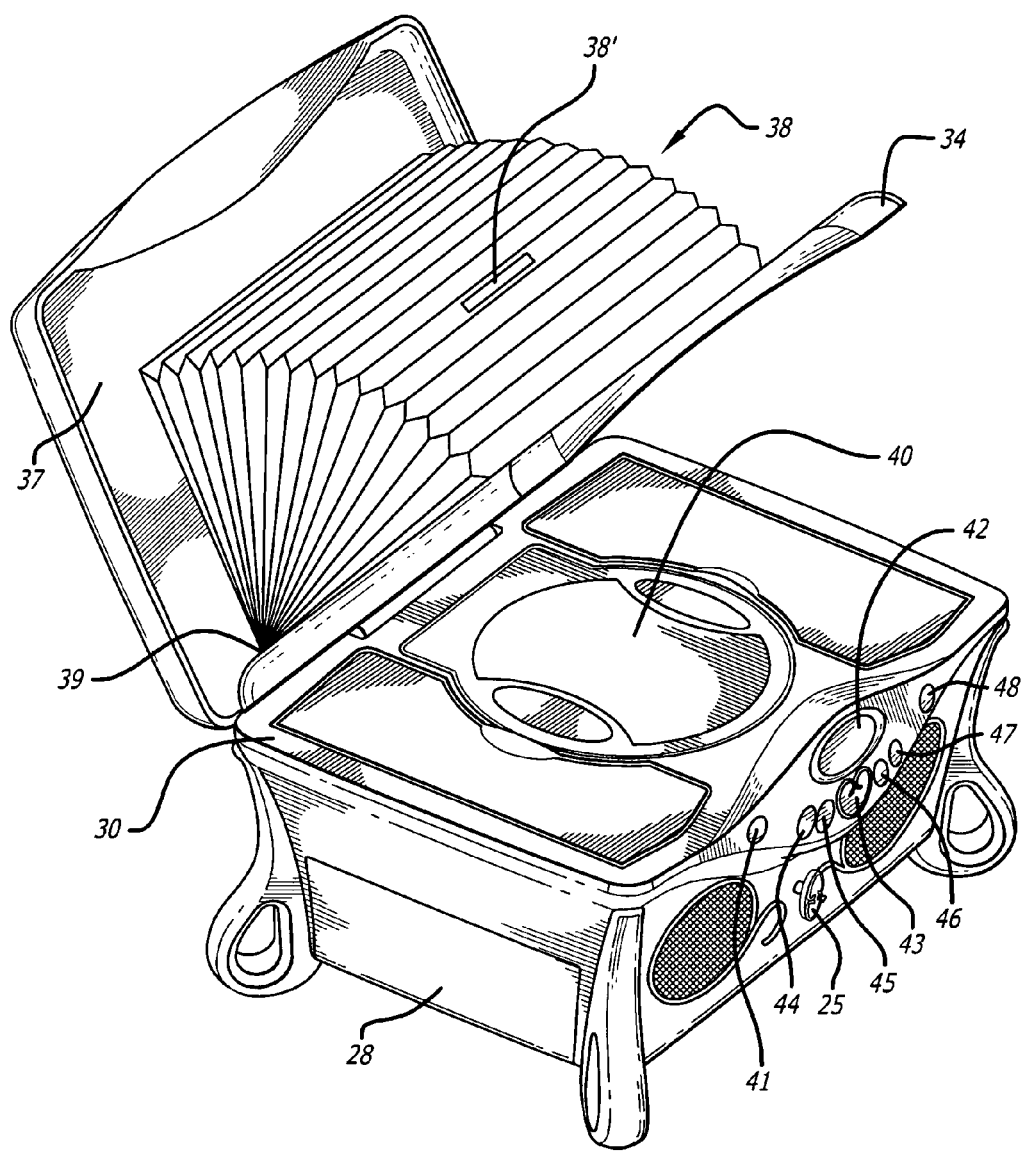
FIG. 6 is a view of the box of FIG. 1 similar to the view shown in FIG. 5, the mirror bezel being shown in open position with respect to the lid illustrating storage of a plurality of CDs mounted in storage envelopes therein.

As seen in FIG. 6, the bezel wall 34 may be moved away from the inner wall 37 of lid 16 exposing a compact disk (CD) accordion-style storage sleeve binder 38, secured at bottom 39 in any suitable manner, providing a plurality of storage compartments for storing CDs 38' therein. Any suitable material may be used for binder sleeve 38, such as Tyvek, a tough, durable plastic material, manufactured by Dupont.

A hinged CD dome 40 is located in generally the middle of the cover 30 and may be spring loaded, as is well known in the art, so that the user pushes down on the same to open it and load a CD for playing the same.

The front wall 13 of device 10 may have other controls for operating the CD player. Thus, a power switch 41 for the CD player is provided along with a conventional LCD lens 42 and suitable CD operating switches 43 through 48 for stop, pause, forward, reverse, head phone jack etc, as is well known in the art.

As seen in FIG. 7, lid 16 may have a generally centrally located recessed area 49 on its upper surface for receiving a picture frame 50 therein adapted to frame a transparent picture cover 51 overlying a removable picture (not shown). Thus, the cover 51 can be removed so the user can place a photo or the like therein. The picture may carry a theme or the like relating to other indicia that may appear elsewhere on device 10.

In addition to the foregoing, the interior of device 10 may include a suitable operating mechanism 52 for operating the CD player and a suitable touch actuated circuit panel 53 which cooperates with the controls on front panel 13. Loud speakers 54, 55 are associated with grills 23, 24. The LCD lens bevel 56 is disposed on the outside of cover 13 surrounding lens 42, the lens 42 extending into the interior of device 10.

Any suitable number of CDs 38' may be loaded in sleeve 38 (FIG. 6) such as 10. Any suitable source of power may be used, such as a plug 100 (FIG. 3) or batteries, as indicated by the door 101 leading to the battery compartment (not shown) in the interior of device 101. Lid 16 may open at an angle between about 45° to 120° from the horizontal and held in open position in any suitable manner.

Button 25 may be spring loaded and electronically coupled to lid opening mechanism (not shown) so that, when it is rotated, it opens lid 16. The drawers 28, 29 glide smoothly and may be totally removable from device 10. Such drawers may be used to keep jewelry and other trinkets therein.

Any suitable materials may be used, such as various plastic, etc. Any suitable colors may be used for the CD player, any suitable components may be used for the LEDs, switches, etc. Transparent lens, such as for lens 42, may be used. Molded parts may be used and various decorative designs and artwork may be used. High gloss materials may be used where desired.

Mirror 32 may have a reflective outer surface and be silvered on the rear thereof.

Although a particular embodiment of the disclosure is disclosed, variations thereof may occur to an artisan and the scope of the disclosure should only be limited by the scope of the appended claims.

What is claimed is:

1. A combination compact disk player and jewelry box comprising:
    a housing having interconnected sides, a top lid and a bottom, said interconnected sides, said top lid, and said bottom forming an interior of said housing; and
    a compact disk player mechanism positioned below said top lid and disposed within the interior of said housing, the compact disk player mechanism being operatively connected to at least one speaker for transmitting sounds recorded on a compact disk;
    said housing further having at least two jewelry drawers slidably mounted in one of said interconnected sides of said housing, each of said at least two jewelry drawers configured for holding jewelry therein; each of said at least two jewelry drawers further being configured for moving between a first position wherein each of said at least two jewelry drawers extends out of said housing and a second position wherein each of said at least two jewelry drawers occupies a portion of the interior of said housing;
    wherein said top lid is configured to occupy one of a closed position and an open position by operating about a hinge mounted to said housing and said top lid;
    wherein said top lid in the closed position closes off a top of said housing and prevents access to said compact disk player mechanism;
    wherein said top lid in the open position opens the top of said housing and allows access to said compact disk player mechanism;
    wherein said compact disk player mechanism includes a plurality of operating controls accessible from an outside of said housing for playing said compact disk;
    wherein one of said interconnecting sides is a front interconnecting side positioned opposite a back interconnecting side having a connection with said top lid;
    wherein the at least one speaker is disposed within said front interconnecting side;
    wherein said plurality of operating controls are disposed within said front interconnecting side and are comprised of a power switch, a stop operating switch, a pause operating switch, a forward operating switch, and a reverse operating switch;
    wherein said at least two jewelry drawers are configured such that at least one of said at least two jewelry drawers is disposed within a left interconnecting side and at least one of said at least two jewelry drawers is disposed within a right interconnecting side;
    wherein said top lid includes an outer surface and an inner surface, a mirror bezel holding a mirror mounted between said compact disk player mechanism and the inner surface of said top lid, and a storage area configured for storing compact disks therein between said mirror and said top lid inner surface;
    wherein said storage area includes a binder therein having a plurality of spaced compartments for storing a compact disk in each one of said compartments.

2. The combination of claim 1 wherein:
    said housing is generally rectangular in configuration; and
    said housing further includes a supporting leg at each corner for supporting said housing on a supporting surface.

3. The combination of claim 1 wherein said binder is an accordian-style binder.

4. The combination of claim 1, wherein said top lid has a picture frame surrounding a transparent picture cover and is disposed on said outer surface.

5. The combination of claim 4, wherein said picture cover is removable so that a picture or photo may be placed between said top lid and said picture cover.

6. A device comprising:
    a housing having interconnected sides, a top lid and a bottom, said interconnected sides, said top lid, and said bottom forming an interior, wherein one of said interconnecting sides is a front interconnecting side positioned opposite a back interconnecting side having a connection with said top lid;
    a compact disk player mechanism positioned below said top lid and disposed within the interior of said housing;
    at least two jewelry drawers slidably mounted in one or more of said interconnected sides of said housing, said at least two jewelry drawers being configured for holding jewelry therein and occupying one or more portions of the interior of said housing when closed; and
    a wall structure connected to a portion of said housing;
    wherein one or more speakers are disposed within said front interconnecting side;
    wherein said top lid is configured to occupy one of a closed position and an open position by operating about a hinge mounted to said housing and said top lid;
    wherein said top lid in the closed position closes off a top of said housing and prevents access to said compact disk player mechanism;
    wherein said top lid in the open position opens the top of said housing and allows access to said compact disk player mechanism;
    wherein said wall structure is movable away from an underside of said top lid to provide access to an accordion-style storage sleeve binder configured for holding a plurality of compact disks;
    wherein said compact disk player mechanism is operatively connected to a plurality of operating controls disposed at the front interconnecting side of said jewelry box, said plurality of controls being comprised of a power switch, a stop operating switch, a pause operating switch, a forward operating switch, and a reverse operating switch;
    wherein said at least two jewelry drawers are configured such that at least one of said at least two jewelry drawers is disposed within a left interconnecting side and at least one of said at least two jewelry drawers is disposed within a right interconnecting side;
    wherein said top lid includes an outer surface and an inner surface, said wall structure includes a mirror bezel holding a mirror mounted between said compact disk player mechanism and the inner surface of said top lid, and a storage area including the accordion-style storage sleeve binder is configured for storing compact disks therein between said mirror and said top lid inner surface;

wherein said at least two jewelry drawers are positioned below said compact disk player mechanism.

7. The device of claim 6, further comprising a plurality of legs configured to support said housing on a supporting surface.

8. The device according to claim 6, wherein said compact disk player mechanism further comprises a hinged compact disk dome positioned such that the hinged compact disk dome is accessible when said top lid is opened, said hinged compact disk dome being spring loaded such that it opens responsive to a downward pushing action.

9. A combination compact disk player and jewelry box comprising:
- a jewelry box having interconnected sides, a top lid and a bottom, said interconnected sides, said top lid, and said bottom forming an interior of said jewelry box, said top lid comprised of an upper wall structure and a lower surface;
- at least two drawers for holding jewelry disposed within said jewelry box, said at least two drawers being positioned at one or more of said interconnected sides of said jewelry box;
- a compact disk player mechanism positioned below said top lid and disposed within said jewelry box and operatively connected to a plurality of operating controls disposed at a front side of said interconnected sides of said jewelry box, said plurality of operating controls being comprised of a power switch, a stop operating switch, a pause operating switch, a forward operating switch, and a reverse operating switch;
- a storage area enclosed within an interior compartment defined by said upper wall structure and said lower surface of said top lid, said storage area being exposed responsive to moving the upper wall structure away from said lower surface;

wherein said compact disk player mechanism is contained below said top lid and disposed within said jewelry box such that:
- said compact disk player mechanism is amenable to placement of a compact disk therein responsive to the top lid of the jewelry box being opened; and
- said compact disk player mechanism is amenable to control through said plurality of operating controls;

wherein the front side of said interconnecting sides is positioned opposite a back interconnecting side having a connection with said top lid;

wherein the compact disk player mechanism is operatively connected to at least one speaker for transmitting sounds recorded on said compact disk, the at least one speaker being disposed within said front side;

wherein said at least two jewelry drawers are configured such that at least one of said at least two jewelry drawers is disposed within a left interconnecting side and at least one of said at least two jewelry drawers is disposed within a right interconnecting side;

wherein said upper wall structure includes a mirror bezel holding a mirror mounted between said compact disk player mechanism and the lower surface of said top lid, and said storage area includes an accordion-style storage sleeve binder which is configured for storing compact disks therein between said mirror and said top lid lower surface;

wherein said accordion-style storage sleeve binder has a plurality of spaced compartments for storing a compact disk in each one of said compartments.

* * * * *